United States Patent
Mitchell

(10) Patent No.: US 6,323,774 B1
(45) Date of Patent: Nov. 27, 2001

(54) PORTABLE EXCESS WATER USAGE CONTROL AND ALARM SYSTEM

(76) Inventor: Gregory L. Mitchell, 6 Barracuda La., Key Largo, FL (US) 33037

( * ) Notice: Subject to any disclaimer, the term of this patent is extended or adjusted under 35 U.S.C. 154(b) by 915 days.

(21) Appl. No.: 08/527,788

(22) Filed: Sep. 13, 1995

(51) Int. Cl.$^7$ .................................................. G08B 21/00
(52) U.S. Cl. .................. 340/606; 340/605; 340/609; 340/615; 340/616; 340/618; 340/870.02; 324/207.11
(58) Field of Search ..................... 340/606, 605, 340/616, 618, 603, 609, 610, 615, 870.02, 870.05; 364/556; 137/551; 324/207.11

(56) References Cited

U.S. PATENT DOCUMENTS

| | | | |
|---|---|---|---|
| 3,810,480 | * | 5/1974 | Smith et al. ........................ 134/104 |
| 4,803,632 | * | 2/1989 | Frew et al. ..................... 340/870.02 |
| 4,936,508 | * | 6/1990 | Ingalz .................................. 340/610 |
| 5,228,469 | * | 7/1993 | Otten et al. ............................ 137/80 |
| 5,347,264 | * | 9/1994 | Björkman ............................. 340/611 |
| 5,351,725 | * | 10/1994 | Suthergreen et al. ............... 340/611 |
| 5,369,598 | * | 11/1994 | Horiike et al. ....................... 340/609 |

\* cited by examiner

*Primary Examiner*—Edward Lefkowitz
*Assistant Examiner*—Davetta W. Goins
(74) *Attorney, Agent, or Firm*—Malin, Haley & DiMaggio, P.A.

(57) ABSTRACT

A monitor, shutoff control, and alarm for use with an inlet water supply obtained from a municipal water supply to prevent excessive usage of water due to leakage or human error, that includes a measuring means and shutoff valve connected to the inlet supply, a processor that includes a program for setting threshold values of water volume per unit time anticipated by the particular household, which, when exceeded, will set off an audio alarm or will activate a telephone dialer to call a predetermined number if no one is at home. The system is programmed in volume increments of time, such as hours, days, or weeks, to accommodate systems that include sprinklers which may require some volume of water over a short period of time. The system can be portable. It is easily installed and mounted in conventional water systems for homes, but can be individually adjusted based on the anticipated water usage of a particular household. If a household anticipated using 400 to 500 gallons of water per day, which would include showers, sprinkler systems, and all water usage, then the threshold value of the system could be preprogrammed to 700 or 800 gallons of water per 24-hour period which, if exceeded, would set off the alarm. The system is especially useful for homeowners who do not live in the particular dwelling year-round, but require leaving the water system on so that lawns can be watered and the like.

8 Claims, 2 Drawing Sheets

PORTABLE EXCESS WATER USAGE CONTROL AND ALARM SYSTEM

BACKGROUND OF THE INVENTION

1. Field of the Invention

This invention relates generally to an apparatus or system to monitor inlet water usage, such as in a home, boat, RV or commercial well water or any type of water from a city water supply to determine if an excess amount of water is being expended due to a leak, pipe rupture, or over usage and to provide an alarm and to control excess water usage. In particular, the invention utilizes a portable inlet water control and alarm that can measure water usage (volume per unit time), determine that an excess amount per unit time has been exceeded, control the continued flow or stoppage of inlet water, and provide an alarm to a remote source through a telephone line to alert a responsible party.

2. Description of the Prior Art

The use of control and alarm systems for detecting leaks in gaseous or liquid pipes is known in the prior art. It is often desirable to monitor especially hazardous material, such as explosive gases or highly destructive liquids which have to be transported by pipe from one area to another, to insure that there is no underground leakage. U.S. Pat. No. 3,664,357, issued May 23, 1972 to Kreiss, shows a pipe line leakage detection method and installation which includes a means for sounding an alarm and a means for preventing further leakage of liquid in the pipeline. This is a complex system. U.S. Pat. No. 3,667,285, issued Jun. 6, 1972 to Wright et al., shows a system for detecting relatively small leaks in partially inaccessible pipelines having high throughputs. U.S. Pat. No. 3,807,220, issued Apr. 30, 1974 to Ottenstein et al., shows a pipeline system and method that can determine leakage of liquid from a pipeline that extends between two remote stations. U.S. Pat. No. 4,797,666, issued Jan. 10, 1989 to Baxter et al., shows a method and apparatus for monitoring fluid flow to accurately determine whether an abnormal flow condition or a catastrophic flow condition exists in such a supply system. Typically, the systems described herein are integrally built into the overall liquid/fluid transport systems, are fairly complex in design, and are costly. U.S. Pat. No. 5,251,653, issued Oct. 12, 1993 to Tucker et al., shows a control system for automatic fluid shutoff that detects unwanted flow. U.S. Pat. No. 5,287,884, issued Feb. 22, 1994 to Cohen, shows a water flow monitoring system for determining the presence of leaks and stopping flow impelling lines.

The present invention provides a portable, easily installed, fluid volume per unit time counter, control, and alarm system that can provide an alarm remotely through a telephone line when people are not at their home or business. In particular, the present invention would be useful in a vacation home or in a home where it is desired to keep the water supply on for normal activities such as adding water to a swimming pool and lawn watering, while at the same time allowing remote monitoring of the overall system.

An example of usage would be in areas where city or municipal water is quite expensive. Many of these areas have vacation or winter type homes in which the homeowners are not always present year-round in their homes. The Florida Keys would be an example. However, the homeowners may travel back and forth and require daily activities in the homes through caretakers and the like, where it is not desirable to shut the water supply off completely while the homeowner is absent. The systems can be used to reduce consumption by having available a visual display of current usage.

The present invention provides an easily installed, inexpensive device that will allow a homeowner to monitor the amount of water consumed for given periods of time and an alarm system to alert the homeowner at a remote location through the telephone lines if an excessive amount of water has been consumed. The system also provides for a control system to shut down the input of water if a particular volume of water per period of time has been exceeded.

SUMMARY OF THE INVENTION

A system for counting the number of gallons of water usage per unit time, monitoring the volume of usage per unit time, providing an alarm for an excessive use of water per unit time, and controlling water usage, typically in a home, from a municipal water supply or well system.

The system is comprised of a mechanical electrical liquid volume counter that can measure gallons per minute of water flow through an inlet pipe that is permanently installed in the inlet water supply from a municipal water source (or well source) after the water meter. A pair of manually-actuated shutoff valves are mounted before and after the water volume measurement device. During normal operation, both manually-actuated valves would be in the "open" position.

The system also includes a central control box that includes a processor (computer processor unit or CPU) and a visual counter display, such as an LED, showing gallons per unit time. The processor acts in conjunction with and controls the entire system as described below. In general, the processor receives input information from the volume counter in the main inlet pipeline. The processor includes a timing unit that includes real time as measured from a particular starting point. The time measurement is combined with the volume counter input to give a volume per unit time. A reset button is also included to allow the system to be reset to zero, also as a function of real time.

The processor is powered by a low voltage power supply that emanates from a 12-volt transformer and rectifier. The transformer and rectifier receive power from a conventional 110-volt AC power supply. The volume counter also requires a low voltage power supply. Thus, the conventional power supply, when passed though the transformer and rectifier, can also power the counter to the pipeline.

The processor can also have a battery backup in case of main power failure so that the system will still continue to operate as far as sending an alarm out.

Also connected to the processor is a telephone dialer. The telephone dialer is connected to a typical home telephone system. The telephone dialer may include one or more preprogrammed telephone numbers that will be dialed in the event that the water inlet pipe's volume per unit time exceeds a predetermined threshold that has been preset into the system. The processor is also connected to a local audio and visual alarm in the home or business that can be triggered, again in the event the volume per unit time is exceeded in the flow through the inlet pipe.

The processor allows for setting the threshold values, which could be a function of the amount of anticipated water usage over a period of time as determined by whether or not the homeowners are in daily residence in the house or are temporarily at a remote location, whereby low volumes of water per unit time would be anticipated.

The processor may include counters that provide for a daily counter, a weekly counter, a monthly counter, or a yearly counter, that is displayed visually by a LED screen, or the like, mounted on the front of the central control box.

The processor will be programmable to allow the user to vary the threshold value of maximum water volume per unit hour based on the homeowner's particular situation. For example, if the home includes a sprinkler system that uses city water, then it could be anticipated that for short periods of time when the sprinklers are on, large volumes of water could be used. Water usage such as showers, dishwashers, washing machine, or the like could also use a maximum flow of water for short periods of time. The number of people living in a household will affect the volume of water usage per unit time and should be anticipated. Once the processor has been programmed with an acceptable amount of water volume per unit time and a threshold value, above which per unit time will cause an alarm circuit to be triggered, several different functions can be accomplished. A first function of the triggered alarm circuit would be to alert a telephone dialer which sends a signal to the telephone, causing the telephone to call a remote number. At this point, a recording could be heard that says that the input water level has been exceeded and that the system should be checked and monitored. A second function would be to trigger a visual alarm, such as a flashing light, and an audio alarm, such as a buzzer or bell, to alert someone in the area that there is a water problem. Another alarm, once triggered in the alarm circuit, could send a signal back to a solenoid-actuated valve that would shut off the inlet water supply to the system.

The system can be constructed of a small portable unit (hand lifted) that would include a small counter that is hooked into the inlet water pipe and allows inlet water to flow through it. The processor memory and programming units can be in a relatively small housing (one cubic foot). Therefore, the central control housing box that includes processor, the LED or other type of numerical display and other control circuitry described herein can also be relatively small. The system can also contain a telephone dialer which is connected to the system telephone circuitry. The entire system as described herein can be made so that it is hand held or portable.

It is an object of this invention to provide an improved municipal water inlet excessive use monitoring system to prevent the wasting of water by allowing remote alarms to signal the use of excess water.

It is another object of this invention to provide a portable, easily installable, home water inlet alarm to detect the excess usage of water, to control and shut off excess usage of water, and to remotely alert the property owner of the excess usage of water.

And yet still another object of this invention is to provide a house water leakage alarm system to remotely alert an interested party that the water system has a leak, causing excess water usage per unit time.

And yet still another object of this invention is to provide a home alarm for use by people at home that tells the homeowner that a certain amount of municipal water has been utilized per unit time to prevent over-watering of the lawn or overfilling of a swimming pool.

In accordance with these and other objects which will become apparent hereinafter, the instant invention will now be described with particular reference to the accompanying drawings.

DESCRIPTION OF THE PREFERRED EMBODIMENTS

Figure 1:
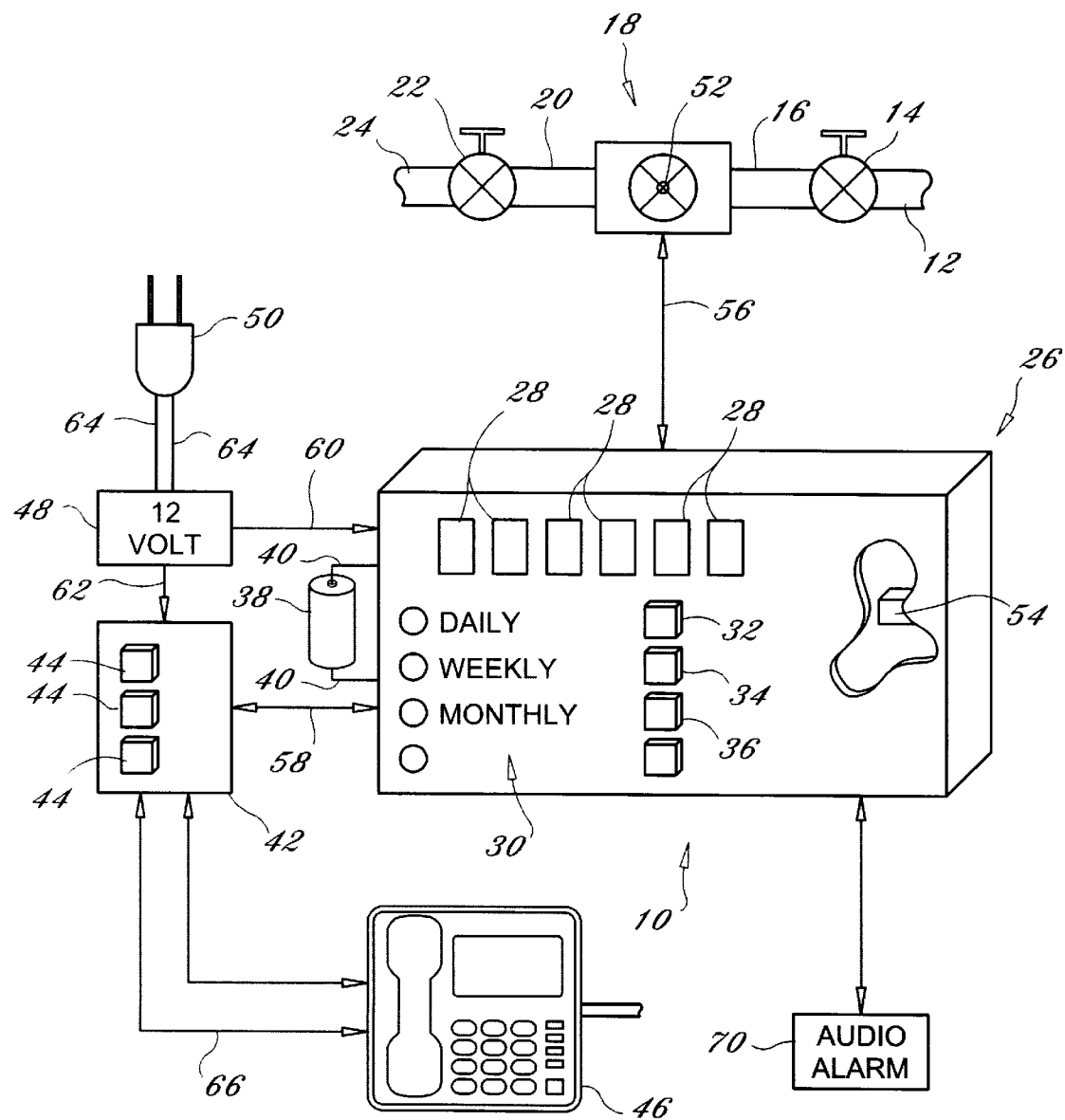
FIG. 1 shows a schematic diagram of the present invention.

Referring now to FIG. 1, the invention is shown generally at 10, comprised of a central control box 26 which houses a processor and includes a visual display 28, such as an LED display, that shows the number of gallons of water utilized over a preset time period. The central control box 26 includes a plurality of input devices 30 that are switches to activate daily, weekly, or monthly readings for the unit and for display 28. Other input or observation devices may include a reset button 32 and a pair of lights 34 that show that a backup battery is low, and light 36 which could show that normal power is on.

The control box 26 is also connected to the electrical circuitry therein. A battery 38 is connected by wires 40 into the internal circuitry. Battery 38 acts as a backup battery for power if the main power source connected to plug 50, such as a 110-volt AC, is shut down for any reason. The processor inside the control box 26 and a telephone dialing device 42 are connected to a rectified 12-volt power source 48, which is also connected by wires 64 to a plug 50 which allows it to be plugged into a conventional outlet.

A standard telephone 46, which is found in the home, and its jack or inlet boxes can be connected to the telephone dialer 42. A plurality of individual telephone numbers can be set through program buttons 44, which allow for different phone numbers to be set. Note that the telephone dialer is connected into the control box 26 and into the processor 54 contained therein through a wire 58.

A water volume meter which measures the amount of volume per unit time 18 is connected between pipes 16 and 20. Pipe 12 is a water pipe that is connected to the municipal water supply after a typical home water meter. Water shutoff valve 14 is a manually-actuated valve that allows water to be controlled manually and shut off. Inlet water pipe 16 connects into counter and controller 18. Water pipe 20 is an outlet pipe from the counter and controller 18 that goes to a manually-actuated second shutoff valve 22 which is just for safety purposes, which is connected to a water pipe 24 feeding the normal house system.

The water volume counter and controller 18 includes a rotatable impeller that rotates based on demand of water flow in incoming pipes 12 and 16. The volume counter and controller 18 also includes a timer and an electronic counter that measures the amount of volume used per unit time that is connected to the processor 54 through input and exchange wire 56. Element 52 represents the counter and a control shutoff valve, if necessary. Wire 56 may also represent power supplied to unit 18 from the central control box 26. The audio alarm 70 is also connected to an output from the processor 54 in central control box 26.

Figure 2:
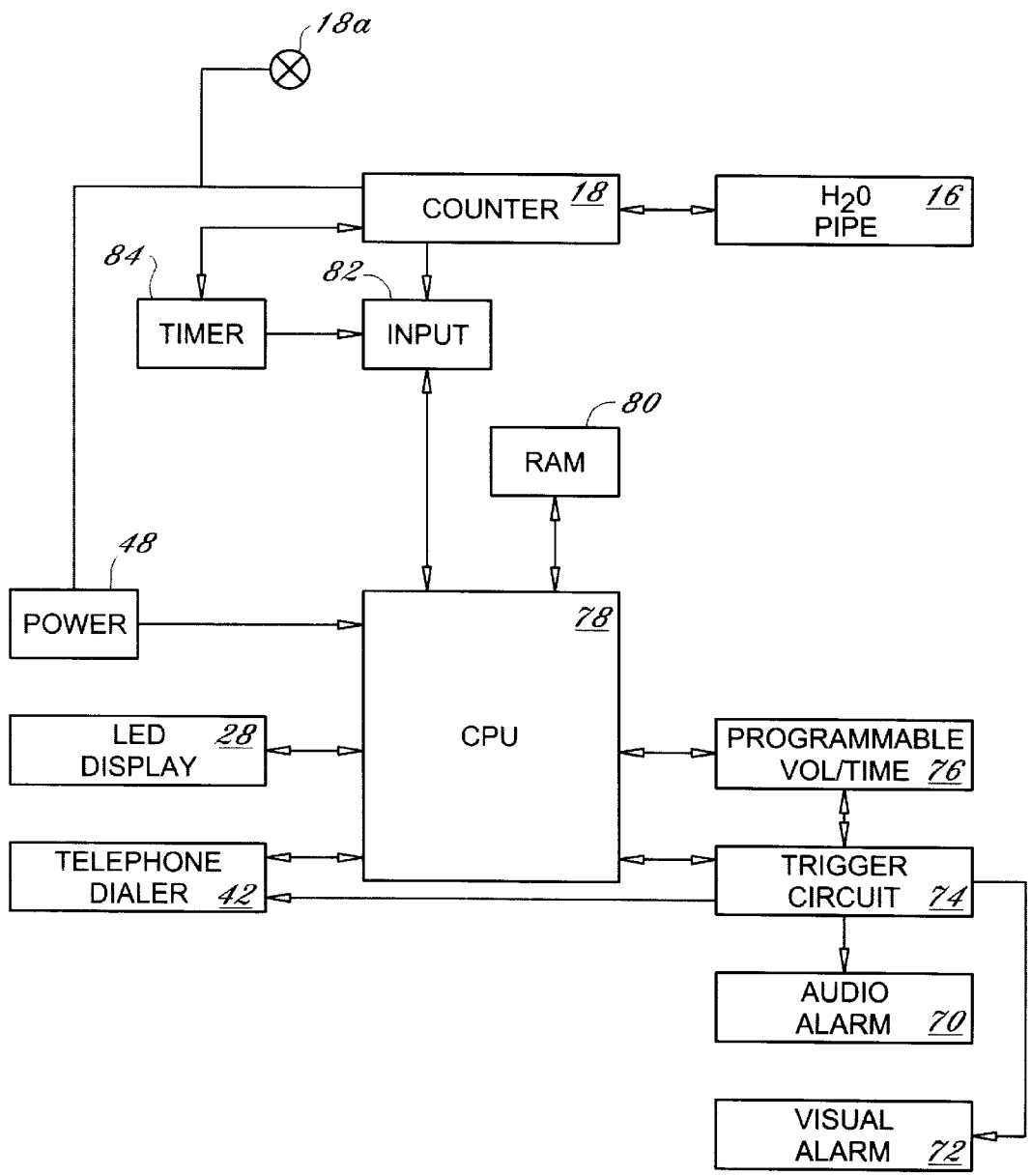
FIG. 2 shows a block diagram of the control unit utilized in the present invention.

FIG. 2 shows the circuitry necessary to accomplish monitoring, shutoff, control, alarm triggering and an output signal to the telephone dialer, which constitutes, in essence, a control and alarm system. FIG. 2 also shows how the LED display, which has the gallons displayed, is connected to the processor 78.

Essentially, any water demand used in the house, such as showers, toilets, outside water spigots, sprinkler system, or leaks will cause water to flow through the inlet pipe 16. As the water flows through the inlet pipe 16, the differential pressure in the water line based on inlet pressure from the municipal supply will move or rotate an impeller mounted inside counter 18. The impeller is connected to an electrical counter that measures the amount of gallons passing by the counter as a function of time. A timer 84 provides real time input and timing for the processor and the counter. The processor accumulates time from a preset moment when the counter is turned on until the counter is turned off, as well as an accumulation of volume per unit time.

The processor 78 and the devices shown in FIG. 2 are mounted in the control unit 26, except for the telephone dialer and audio and visual alarms. The counter is mounted on the inlet pipe 16.

The processor 78 receives input commands from input 82, which allows for setting the alarm for a daily, weekly, or monthly volume of water anticipated. A programmable input 76 allows the homeowner to establish a particular maximum volume of water per unit time that will be used to trigger the circuit alarms. This volume would also trigger the telephone dialer. If an average homeowner uses 300 to 400 gallons of water per day, which includes sprinkler systems, showers, and the like, then the programmable volume per unit timer 76 could be preprogrammed through the input to be 500 gallons per day. This would be the preset threshold value of the system that would cause a response if more than 500 gallons per 24 hours was expended. A second backup per unit time could be set of 400 gallons per hour, which would be 7 gallons per minute running steadily for an hour.

The processor 78 includes random access memory that stores information necessary to control the system and allows it to be programmed for particular environments. In addition, a trigger circuit is connected to the processor. The circuit provides a triggering output signal connected to an audio alarm 70, the visual alarm 72 which could be a flashing light mounted in a conspicuous area. The triggering output signal is also connected to the telephone dialer 42.

Power supply 48 provides low voltage power to the volume counter, the processor, and possibly the telephone dialer, if necessary, either through the processor or directly to the telephone system.

To operate the present invention, the counter is connected in fluid communication with inlet pipe 12 and shut off valves 14 and 22 and control 18 includes a shutoff valve and is permanently connected to inlet pipe 16, which is connected to the municipal water supply. The counter and control 18 is then connected to the control box 26 by circuit 56, and in particular, part of the input circuitry that goes to the processor and the timer.

It is believed that the entire system can be comprised of the counter and controller that is connected to the pipe 16 and wiring to a central box that includes the processor, the programmable volume per minute timer, the triggering circuit means, the LED display, any random access memory necessary, all of the human input devices to program the system, and the timer. A third unit would be the telephone dialer which is connected directly to the telephone system.

Once the system, which can be portable, is installed and electrically powered by plugging into a conventional 120 V, AC power supply, then a particular water usage volume per unit time is selected by the user. Thus, the system is capable of accumulating water usage for a specific time period, such as 24 hours, or for one week, and realizing when water usage it exceeds the volume per unit time threshold value set in the programmable volume per unit timer 76. If that threshold value is exceeded as compared in the processor to the amount of actual water used per unit time as measured by the volume counter 18, then the triggering circuit is actuated, causing the audio alarm to go off and/or the visual alarm and the telephone dialer. At this point, a prerecorded message will be contained in the telephone dialer, that upon receiving connection to the telephone number dialed, will tell the recipient of the telephone call that the water consumption at the alarm site has been exceeded so that appropriate action can be taken.

The in-house audio alarm 70 and visual alarm can also be used by people who are on site all the time. Oftentimes, a swimming pool must be fed an additional water supply in which the hose is just turned on and left in the pool for a period of time. In addition, if lawn sprinklers do not have an automatic shutoff system, sprinklers are often forgotten and left on. The present system can thus be used by absentee owners to insure that water leakage does not exceed an amount that would waste large quantities of water or can alert homeowners at home that a certain water system is inadvertently running.

The present system is to prevent large usages of water, especially in areas where water is extremely expensive, from occurring through either leakage or human error. The system can be programmable for a specific and unique family unit, wherein average amounts of water consumed are readily discernible. It can be used by persons who are at home or who are away on vacation or at another homesite.

Inasmuch as the present system is portable and is easily installed, it can be used as an after-market item for conventional homes already in use by easily installing the counter control to the inlet pipeline and plugging in the unit which is mounted in a convenient area for the user.

The systems could be used to be linked in a municipal network to allow remote reading that the water usage from the municipal water company headquarters by modem through telephone.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A portable system to monitor, control, and provide an alarm for excessive use of an inlet water supply though an inlet pipe from a water source under pressure, comprising:

a measuring means for providing measurements of the inlet pipe volume of water per unit time, said measuring means comprising a rotatable impeller, a timer, and an electronic counter;

a central control box having an interior and an exterior, said central control box sized to be hand-held and portable;

a first user interface means for entering a threshold value of inlet pipe volume of water per unit time, said user interface means housed in said interior of said central control box;

a visual display mounted on said exterior of said central control box for displaying gallons of water used per unit time;

a second user interface means for entering said unit time period, said second user interface means mounted on said exterior of said central control box;

a comparison means for correlating the inputted threshold value and the measurements of the inlet pipe, said comparison means comprising a processor and a computer program readable by said processor for comparing said measurements of inlet pipe volume per unit time and said threshold values of inlet pipe volume per unit time, said comparison means housed in said interior of said central control box;

an alarm means for providing an alarm when the inlet pipe measurement exceeds the inputted threshold value, said comparison means actuating said alarm means when said measurements exceed said threshold values.

2. A monitor control and alarm device as in claim 1, in which said alarm means comprises:
   a triggering circuit means for providing an output signal;
   a telephone dialer connected to said triggering circuit means for connecting to a typical home telephone system for dialing preselected telephone numbers whenever said output signal is received from said circuit means.

3. A monitor control and alarm device as in claim 1, in which said alarm means comprises:
   a triggering circuit means for providing an output signal;
   an audio alarm means connected to said triggering circuit means for providing an audio alarm whenever said output signal is received from said triggering circuit means.

4. A monitor control and alarm device as in claim 1, in which said alarm means comprises:
   a triggering circuit means for providing an output signal;
   a visual alarm for providing a visual alarm whenever said output signal is received from said triggering circuit means.

5. A monitor control and alarm device as in claim 1, including an auxiliary battery power supply connected to said processor, which can be activated if the main power supply fails.

6. A monitor control and alarm device as in claim 5, including:
   a first light mounted on the exterior of said control box for acknowledging the operability of the system; and
   a second light mounted on the exterior of said control box and connected to said battery for showing that the battery is low on voltage, below a threshold minimum.

7. A monitor control and alarm device as in claim 1, wherein said measuring means includes a shutoff valve connected to said inlet pipe, said shutoff valve electrically operated and controlled by said processor when the volume per unit time has exceeded an inputted shut off value.

8. A portable system to monitor, control, and provide an alarm for excessive use of an inlet water supply though an inlet pipe from a water source under pressure, comprising:
   a measuring means for providing measurements of volume of inlet water per unit time connected to said inlet water supply, said measuring means including a rotatable impeller, a timer, and an electronic counter;
   a processor connected to said measuring means;
   a central control box housing said processor, said box having an interior and an exterior;
   a first input means connected to said processor and mounted on the exterior of said control box for inputting information into said processor;
   a second input means connected to said processor and mounted on the interior of said control box for inputting information into said processor;
   a triggering circuit means connected to said processor for providing an output signal;
   a computer program internal to said processor for excepting an input value from said first and second input means, of a predetermined threshold value of water volume per unit time, and excepting measurements from said measurement means, accumulating and manipulating said measurements, comparing said input and said accumulated and manipulated measurements, and actuating the output signal of said triggering circuit means when the accumulated and manipulated measurements exceed the input value;
   telephone dialer connected to said alarm circuit means for connecting to a typical home telephone system for dialing preselected telephone numbers whenever said output signal is received from said circuit means;
   an audio alarm means connected to said triggering circuit means for providing an audio alarm whenever said output signal is received from said triggering circuit means;
   a visual alarm for providing a visual alarm whenever said output signal is received from said triggering circuit means;
   a shutoff valve connected to said inlet pipe, said shutoff valve electrically operated and controlled by said processor when the volume per unit time has exceeded an inputted shut off value;
   a display means connected to said processor and mounted on said exterior of said control box for displaying values manipulated by said program, said display means controllable from said first input means;
   a plug connected at a first end in series to said processor and said telephone dialer, said plug having a second end for supplying power from a conventional 110-volt AC power source; and
   a transformer means juxtaposed near said first end and said second end of the plug for providing a low voltage power supply to said processor and said telephone dialer;
   whereby said processor can be programmed for predetermined unit time increments, hourly, daily, weekly, or monthly, and predetermined volumes per increments of unit time that establishes a threshold value which, when exceeded, activates said triggering circuit means.

* * * * *